(12) United States Patent
Gainer et al.

(10) Patent No.: US 6,321,219 B1
(45) Date of Patent: Nov. 20, 2001

(54) DYNAMIC SYMBOLIC LINKS FOR COMPUTER FILE SYSTEMS

(75) Inventors: Patrick J. Gainer, Sunnyvale, CA (US); James R. Hamilton; Surendra Verma, both of Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/134,792

(22) Filed: Aug. 14, 1998

(51) Int. Cl.[7] ..................................................... G06F 17/30
(52) U.S. Cl. ................................................................ 707/3
(58) Field of Search ........................................ 707/3, 1, 2

(56) References Cited

U.S. PATENT DOCUMENTS

| | | | |
|---|---|---|---|
| 5,649,200 | * | 7/1997 | Leblang et al. ........................... 717/3 |
| 5,905,990 | * | 5/1999 | Inglett .................................. 707/200 |
| 5,937,406 | * | 8/1999 | Balabine et al. ..................... 707/100 |

OTHER PUBLICATIONS

Gifford et al, "Semantic File Systems," Proceedings of the 13th ACM Symposium on Operating Systems Priciples, Oct. 1991, PP 16–25.*

* cited by examiner

*Primary Examiner*—Jack Choules
(74) *Attorney, Agent, or Firm*—Merchant & Gould P.C.

(57) ABSTRACT

A user creates a rule defining file objects to appear at an arbitrary insertion point in a hierarchical file structure. Every request for a file, directory, etc. at the insertion point invokes the rule and constructs a set of dynamic links to actual locations of all file objects that satisfy the rule. Any operations performed by the program on the objects take place transparently on the objects at their actual locations. Between requests, the actual links go away, and only the rule for constructing them remains. An indexer operates continually to maintain current information on all files in the structure.

44 Claims, 5 Drawing Sheets

DYNAMIC SYMBOLIC LINKS FOR COMPUTER FILE SYSTEMS

BACKGROUND

The present invention relates to electronic data processing, and more specifically concerns the creation and use of symbolic links for organizing file structures in a computer.

Most computer operating systems provide facilities for storing individual files in a structured arrangement from which they can be accessed by user application programs. Hierarchical file systems, the most common type, posit a root directory for each logical or physical storage device such as a disk drive. The root directory can contain individual files, and can also contain subdirectories which in turn contain files and subdirectories to any desired level. Directories and subdirectories are identical in function, and are sometimes called folders or other names. Some file systems, the best known of which is UNIX, attach file systems from different devices into a single file hierarchy. This is referred to as "mounting" a file system.

Users employ directory structures to organize their data and programs. For example, a storage device designated "C:" may contain legal documents in a directory "C:\LegalDocs". A user wishes to organize the documents by docket number, and accordingly sets up a subdirectory for each one: "C:\LegalDocs\111803", "C:\LegalDocs\98007", and so on. Each directory at the lowest level then contains files dealing with that particular docket. However, another user may desire to organize the same files on the same storage device by author, using directories such as "C:\LegalDocs\Norm_D_Plume", "C:\LegalDocs\Sue_Donym", etc. A third user may desire all files created within the current month to be in a single directory "C:\LegalDocs\Recent". But, if the operating system can only store each file in a single folder, then the files can be organized in only one way. Application programs such as document-control utilities sidestep this problem by allowing users to create profiles for each file, and then accessing the files in response to users' queries for files having certain characteristics in the profiles. Although these programs function well, they function with only one application program, or with applications that adhere to certain protocols or standards. Placing a number of existing files within a document-control system requires manually generating profiles for each file. These programs tend to be large, expensive, and difficult to configure or modify. In addition, switching from one document-control system to a different one usually requires redoing the profiles of all the files. Also, commercial document-control systems are overkill in many small tasks or ad-hoc situations.

Another approach introduces the concept of symbolic links. Many operating systems include a facility that allows a user or an administrator to create a link between an existing file or directory and a new name. Thereafter, both the new name and the old name refer to the same file or directory. Changes made during an access under either name appear under a later access under the other name as well. These links provide aliases for files, different ways to access the same physical entity.

Conventional links, however, are "static" symbolic links. They require explicit create and delete actions on behalf of a computer user. The links must be manually removed when no longer needed, even after the physical files or directories to which they refer have been removed from the system. The administration of static symbolic links quickly becomes unwieldy as the number of links increases. Because of oversights or interruptions, some files that should be linked will not be linked, and broken links will remain after their underlying files have been removed or renamed. Although system scripts or programs can be written by systems administrators to automate portions of link-management tasks, they are error-prone and have limited function. Such software must be run periodically, and links are likely to become obsolete between runs. Pushed beyond relatively simple file structures, static links obscure the relationships between file-system objects. Further, the creation and maintenance of static links are difficult enough to deter naive or casual users from even attempting to learn how they work.

Therefore, the file structures of many operating systems lack an effective facility for handling multiple organizations of files, folders, directories, and other objects in a manner that is error-free, transparent to all application programs, and simple to learn.

SUMMARY OF THE INVENTION

The present invention provides facilities in the file system of an operating system or other program for creating and maintaining dynamic links among file-system objects. These links differ from conventional static links in that they come into being only when needed to access an object, and they cease to exist whenever a user's access ceases. At the same time, however, dynamic links are more than mere ad hoc relationships that need to be defined anew for every file access. Although the links themselves go away between successive accesses, a persistent rule or definition recreates the links automatically for every access. Therefore, changes to files or directories between accesses are automatically reflected whenever a new access occurs, without any user action in changing or recreating the links.

A utility program accessible to users receives definitions of rules or associations for creating symbolic links among particular file-system objects such as files and directories. Rule creation is simple and direct, and the rules can be general and powerful. A file-system component called a dynamic link driver detects operations occurring at points in the file-system name space where rules have been defined, creates symbolic links among objects as specified by the rules. This link driver can be inserted in the file-management or other modules of conventional operating systems without extensive modifications, perhaps even as a third-party device driver. Because the link driver creates and handles the links within the file system itself, the symbolic links are transparent to all application programs that access files and directories, and even to other levels of the file system itself. That is, an application accesses a linked file or directory with exactly the same mechanisms with which it accesses any file or directory; with no change whatsoever to the application code, and without complying with any additional standard or protocol. A rules component or query processor, either within the file-system link driver or located separately, stores and accesses the data required to carry out the rules. The rules defining a given set of dynamic symbolic links can be satisfied directly by the link driver; that is, the link driver can directly execute and satisfy the rule. Alternatively, the rule can be forwarded to any supported query processor. For example, Microsoft® WindowsNT® 5 supports full content indexing on all files, and its Windows content-indexing component can be the target of the dynamic symbolic link rule. The content-indexing component can receive the query, execute it, and return the result to the link driver, which can use the result to execute the file or directory operation.

The utility program receives from a user a request to associate certain file-system objects. The utility requests the user to specify a location in the file system name space for the association, and to specify a rule, association, relation, or query (these terms are interchangeable) for the insertion point. The utility then installs that rule at the insertion point. A subsequent request from a user application program—or, equivalently, from the system browser—for a file-system object such as a file or a directory at the insertion point invokes the file-system component to call the rules component to determine which objects at what actual locations fit the rule for that insertion point. The file system creates the appropriate links for objects that satisfy the rule, effectively plugging their names or other identifiers into the file system at the insertion point. The file system thereafter returns the objects to the application program transparently, exactly as though they actually existed at the insertion point. The next time the application—or any other application—requests the object, the rules are executed again, and new links are created; that is, the links themselves do not exist between accesses, but only the rules for creating them. Therefore, should a user delete a linked object or move it to a different location during an access, the object might no longer exist or satisfy the rule, and a subsequent access to the same insertion point will simply not create a link to that object. The links thus require no maintenance or administration whatsoever, and there is no time interval during which they are incorrect or obsolete.

DETAILED DESCRIPTION OF THE INVENTION

The following detailed description of preferred embodiments refers to the accompanying drawings that form a part hereof, and shows by way of illustration specific embodiments of the present invention. These embodiments are described in sufficient detail to enable those skilled in the art to practice the invention. Structural, logical, and procedural modifications within the spirit and scope of the invention will occur to those in the art. The following description is therefore not to be taken in a limiting sense, and the scope of the inventions is defined only by the appended claims.

Illustrative Operating Environment

This section provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those in the art will appreciate that the invention may be practiced with other computer-system configurations, including handheld devices, multiprocessor systems, microprocessor-based programmable consumer electronics, network PCs, minicomputers, mainframe computers, and the like. The invention may also be practiced in distributed computing environments where tasks are performed by remote processing devices linked through a communications network. In a distributed computing environment, program modules may be located in both local and remote memory storage devices.

Figure 1:
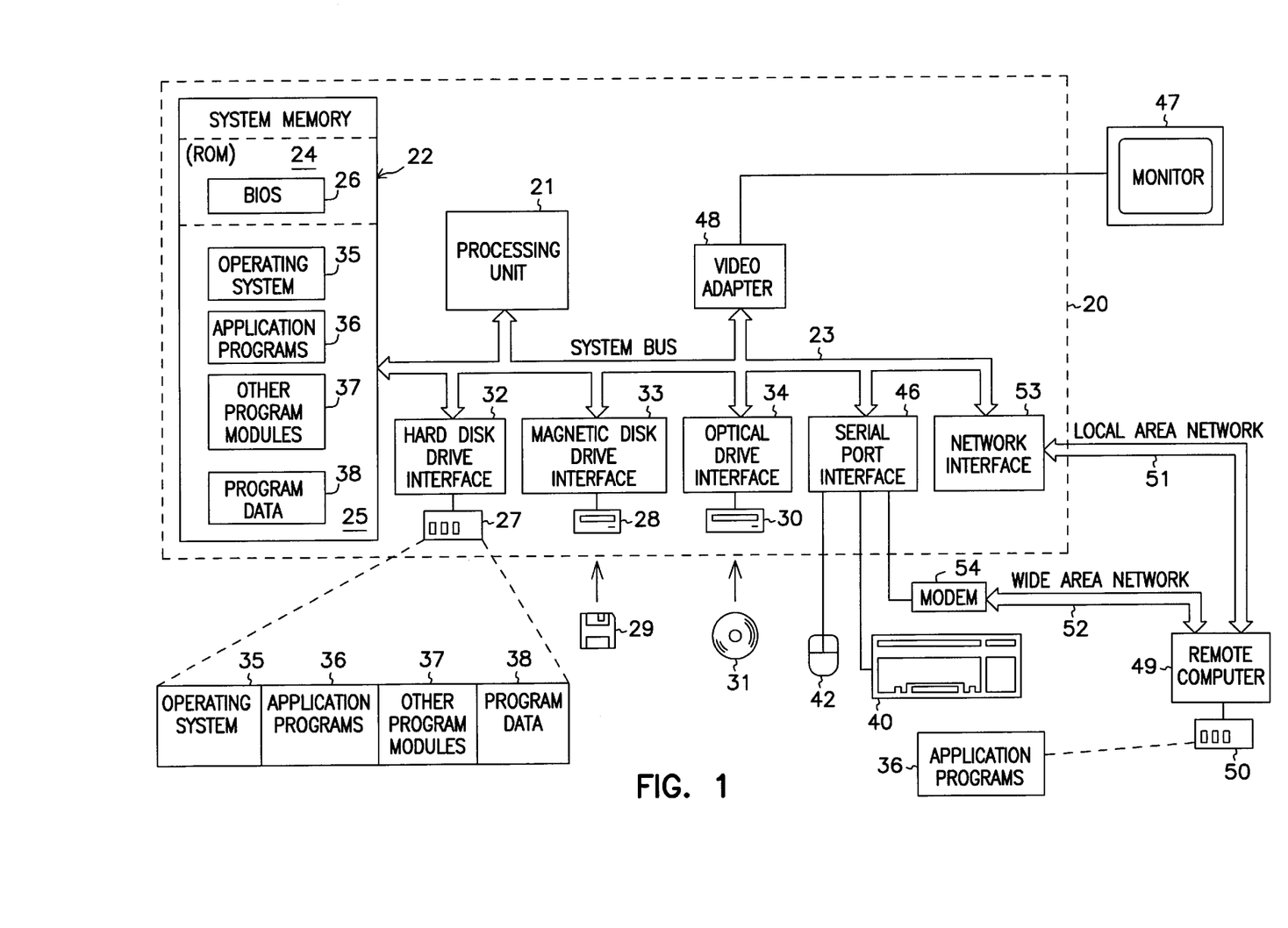
FIG. 1 is a block diagram of a computer system environment suitable for hosting the present invention.

FIG. 1 employs a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 24 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules depicted as residing within 20 or portions thereof may be stored in remote storage device 50. Of course, the network connections shown are illustrative, and other means of establishing a communications link between the computers may be substituted.

Dynamic Symbolic Lines

Figure 2:
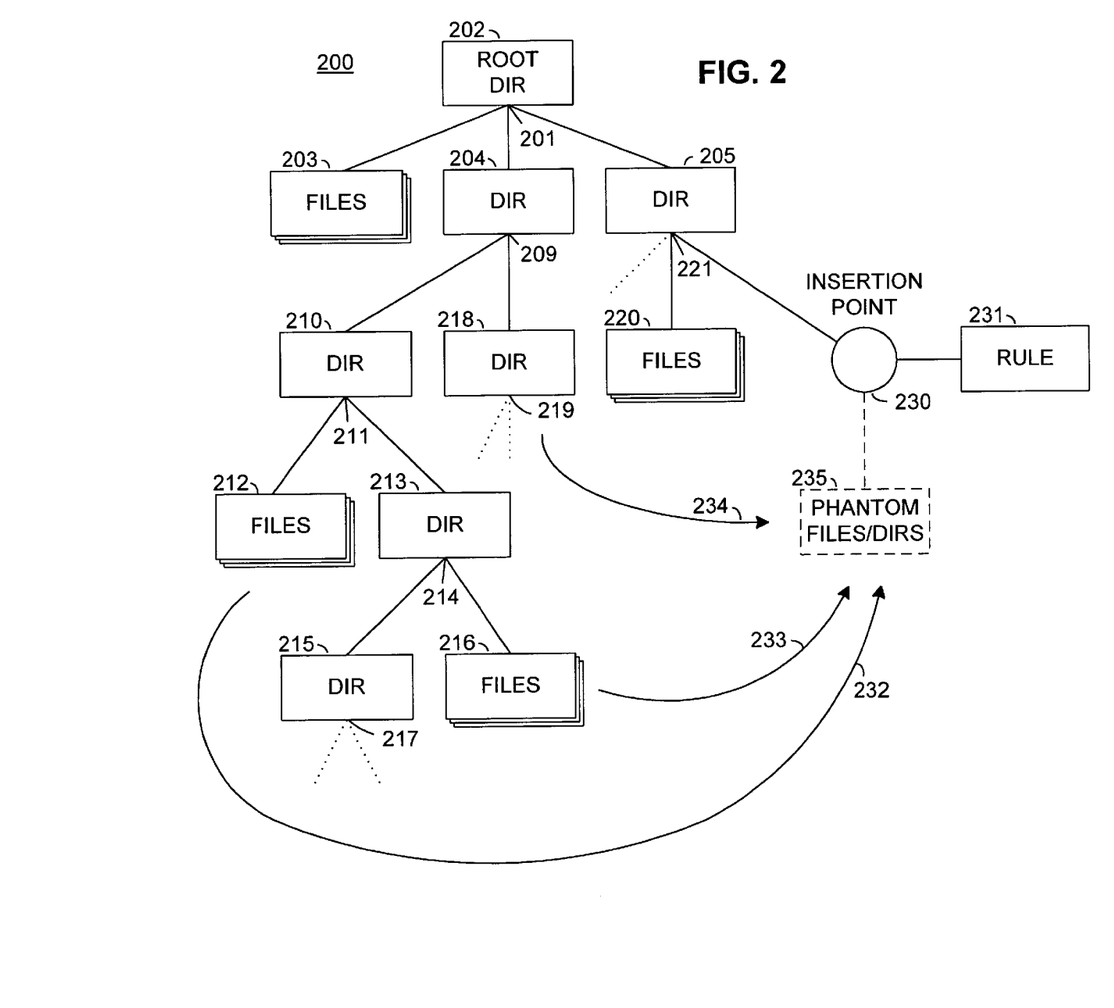
FIG. 2 shows an example of a hierarchical file tree incorporating the invention.

FIG. 2 shows a specific example of a multi-level hierarchical file structure 200 of the type implemented by many conventional computer operating systems, such as Microsoft Windows NT. File structure 200 is organized as a tree having a root node 201 containing a root directory. The root directory contains some files 203, and two subdirectories 204 and 205. The terms 'directory' and 'subdirectory' are equivalent for the present purpose. The term 'file object' is used herein to denote either a directory or a file, and can also be applied to any other resource that can be stored in or referenced by a file system, such as a named pipe or a mailslot. Directory 204 contains two further subdirectories 207 and 208, and therefore defines another node 209. Directory 210 at node 211 contains files and subdirectory 213 at node 214. Directory 213 contains files 215 and yet another directory 216. The dotted lines at node 217 indicate further files and subdirectories to any desired level. Directory 218, located at node 209, may also contain further objects at node 219. Directory 205 is shown as containing files 220 at its node 221, and also contains an insertion point 230. An insertion point is a type of file object for attaching a rule according to the invention.

The example Windows NT operating system implements an insertion point as a reparse point. A reparse point is one that stops a tree traversal and takes some other action; previous operating systems have employed reparse points for purposes such as signaling that demountable volumes should be mounted on tape drives. The file system of the present embodiment identifies a reparse point by a file attribute bit. It returns a code called STATUS_REPARSE, and passes back reparse information, including a reparse tag, any data stored at the point, and the remaining name of any subtree below the reparse point in tree 200. Normally, this information is returned all the way back to the program that had requested the file access; however, components called filter drivers above the file-system drivers have an opportunity to intercept the reparse information and act upon it. Reparse points are advantages in that they do not require new or specialized access-control mechanisms to be created for the invention. Other methods of creating special directories or other file objects can also be employed for the present purpose, although they would typically require file-system extensions or modifications.

The reparse information for effecting the invention includes a representation of a rule or query 231 that defines certain characteristics of the files or other objects for which dynamic links are to be constructed. These files, directories, etc. are actually located in other directories scattered arbitrarily throughout tree 200. For example one or more of the files 212, 216, and the directory 218, located in directories 210, 213, and 204 might satisfy the conditions of rule 231. Dynamic links, shown as lines 232–234, then cause such files to appear to reside in a directory located at insertion point 230. Continuing the previous example, if the name of root directory is "C:\y ", the name of directory 205 is "LegalDocs", and the name of the faux directory at point 230 is "Sue_Donym", then a request to list the contents of directory "C:\LegalDocs\Sue_Donym" returns the names, attributes, and other information for a set of phantom files and directories 235 that are actually located at other places throughout the file structure 200. The requesting program, however, can deal with them as though they were in fact located at the insertion point 230. For example, a user application program can open, modify, move, or delete a file. Any action upon such a file or directory object takes place upon the requested object at its actual location, transparently to the application. When the requesting program closes its access, links 232–234 go away.

Figure 3:
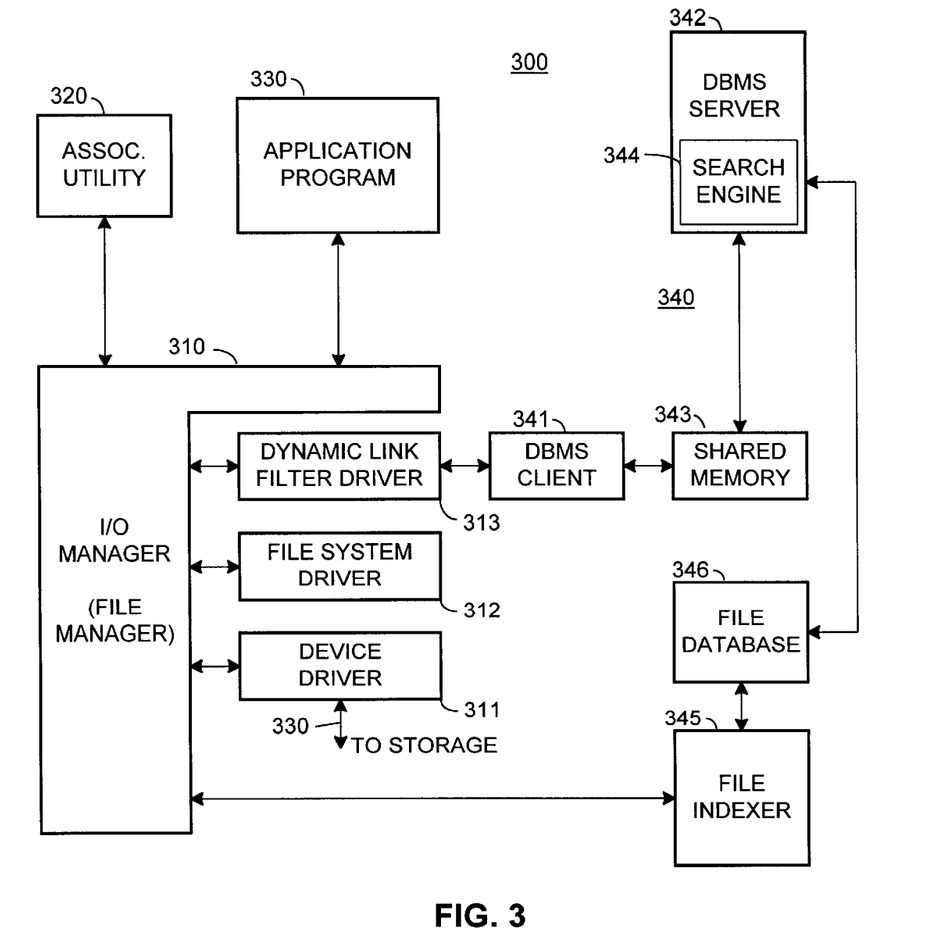
FIG. 3 is a block diagram of software components that participate in the invention.

FIG. 3 shows a system 300 for creating and manipulating dynamic links such as 232–234, FIG. 2. Almost all operating systems such as 35, FIG. 1, include a component known as a file system, file processor, file manager, or similar component. In the example WindowsNT operating system, input/output manager (NTIO) 310 fulfills this overall function as well as other functions not relevant to the present invention; therefore, block 310 is referred to herein as the file system or file manager. (By way of background, the WindowsNT 5.0 NTIO component of this embodiment controls all storage-related I/O and provides the file system interface, but it calls file-system drivers to handle the actual file operations. That is, NTIO does not handle I/O in and of itself. Instead, it calls the appropriate client file-system drivers, called NTFS in WindowsNT.) OS components such as manager 310 typically run in a kernel mode that protects them from user-level programs. A user-level association utility 320 defines which file objects will be linked to which insertion points 230, FIG. 2. The definition can be provided by a user employing input/output (110) devices such as keyboard 40 and display 47; alternatively, some other program can provide or modify the definition. Any application program 330 may request a particular file service in an entirely conventional manner by issuing a standard API (application program interface) to I/O manager 310. Manager 310 processes the API and ultimately issues a request to a storage device 330 that contains data for satisfying the request. The 110 manager processes this data, and either returns it to requesting program 310 or uses it to produce some other reply. In some cases, such as an incorrect syntax in the request, manager 310 turns the request around itself, producing a reply without ever reaching a storage device.

Like most modern file systems, manager 310 has a layered internal structure and employs pluggable components for adding and modifying functionality. Conventional device drivers 311, for example, translate requests in a common internal format into commands and data understood by specific kinds of storage devices, and reformat return data from the devices back into the common format. File system drivers 312 and similar modules perform intermediate functions such as error checking and file sharing. Filter drivers 313 form a newer class of file-system component. They detect a designated condition, flag, or characteristic at a specific I/O-manager level, and intercept a request or returned data. Filter drivers are drivers that receive all I/O requests sent to the target file system and at each level have an opportunity to satisfy the request, fail the request, modify the request, or issue additional requests to satisfy the request that they have received. A filter driver can intercept a file operation between any two layers traveling from an application program downward through the file manager to a physical storage device, and again on the way back from the device to the program. The filter driver then performs a function and can place the request or data back into the manager. Filter drivers are transparent to the operation of I/O manager 310. Conventional filter drivers perform functions such as virus detection, data encryption, and hierarchical storage management. Filter drivers can invoke the services of other modules in the file system, other components of the operating system, and any other program at any level.

System 300 couples a dynamic-link (DL) filter driver 313 to I/O manager 310 for processing dynamic links during application-program accesses to the file system. Driver 313 also connects to a kernel-mode client 341 of a database management subsystem (DBMS) 340. Clients of this type provide a local user interface to a larger DBMS server located either in the same computer or at a remote facility. In this example, DBMS server 342 operates in the user space of the local computer 20, FIG. 1, and connects to client 341 via a conventional block of shared memory 343. A client for use in the invention entails a relatively small and easily written code module for invoking database queries in response to inputs from DL driver 313. Placing the client in the kernel space allows more direct communication with driver 313.

A full DBMS server 340 includes a search engine 344 for processing queries written in a query language such as the commonly used SQL (structured query language). SQL is a powerful and general language, allowing a wide range of conditions and functions, and many computers already include a DBMS program that processes either standard SQL or a relatively large subset of that language. Smaller implementations may employ less extensive facilities or a proprietary query language. Some conventional DBMS servers also include a capability for redirecting queries to other programs, such as to file indexer 344.

File indexer 345 is a facility found in the Enterprise Edition of WindowsNT. Its normal function is to continually update a relational database 346 holding certain characteristics of all the objects stored in file structure 200. That is, columns of database 346 can hold the type, size, date, and other attributes of files and directories. Database 346 can also employ a database to index file contents: words in a document, names in a spreadsheet, and so forth. In system 300, search engine 344 parses a query at an insertion point, and then DBMS server 342 redirects the query to database 346 of file indexer 345.

System 300 is designed to reduce the modifications of an existing operating system, and to employ existing components where possible. Many alternative configurations are possible. For example, file indexer might include its own search engine, using a non-standard query language. Further, the database query processed by subsystem 340 could be replaced by some other kind of rule-processing instrumentality, such as an expert system.

Figure 4:
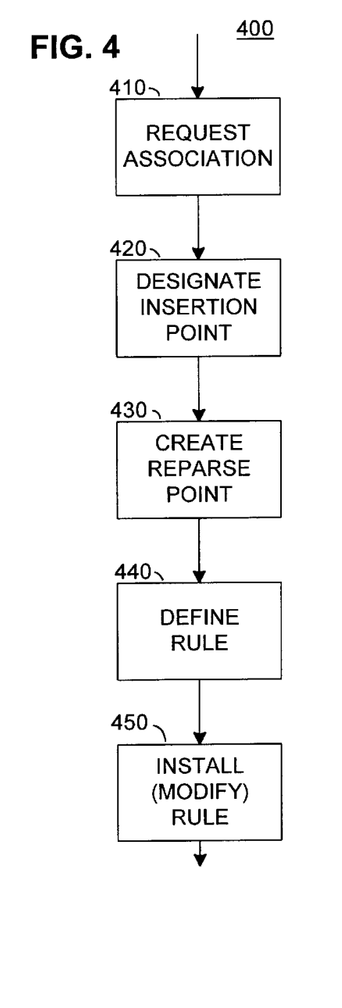
FIG. 4 is a flowchart showing the operation of the association utility of FIG. 3.

FIG. 4 is a flowchart of a method 400 for implementing association utility 320, FIG. 3. A user (or another program) requests at block 410 that dynamic symbolic links be defined. Block 420 receives the user's designation of a point such as 230 in the directory structure 200, FIG. 2, for insertion of the links. Block 430 requests the services of I/O manager 310 to create a reparse point at the designated insertion point. The illustrative WindowsNT file manager creates an empty directory with its reparse attribute set. Block 440 receives the user's definition of a rule for specifying which files should appear at the insertion point. In this implementation, the rule has the form of a query in the wellknown SQL query language. For example, the query SELECT files
FROM LegalDocs
WHERE CONTAINS ('Norm D. Plume') AND Date>Dec. 31, 1997 specifies all files in the LegalDocs subdirectory containing the name "Norm D. Plume" and whose file date is after the end of 1997. The word "files" following the SQL keyword "SELECT" is reserved by the system to represent the database columns corresponding to the file attributes in a standard order. Using a reserved keyword signifies that only this column set is allowed. A standard query language facilitates writing complex file specifications with little or no additional training. However, utility 400 could employ a proprietary or purpose-built query language, or could accept user queries in a simplified format and then translate them into a standard query language. Also, as mentioned, association program could define rules that are not expressed as queries, but in any other form, such as rules for an expert system. Block 450 associates the rule with the insertion point. In this case, a standard API installs the rule by storing the text of the SQL query at the reparse point. The same block can be used to modify or even to delete a rule already present at the insertion point.

Figure 5:
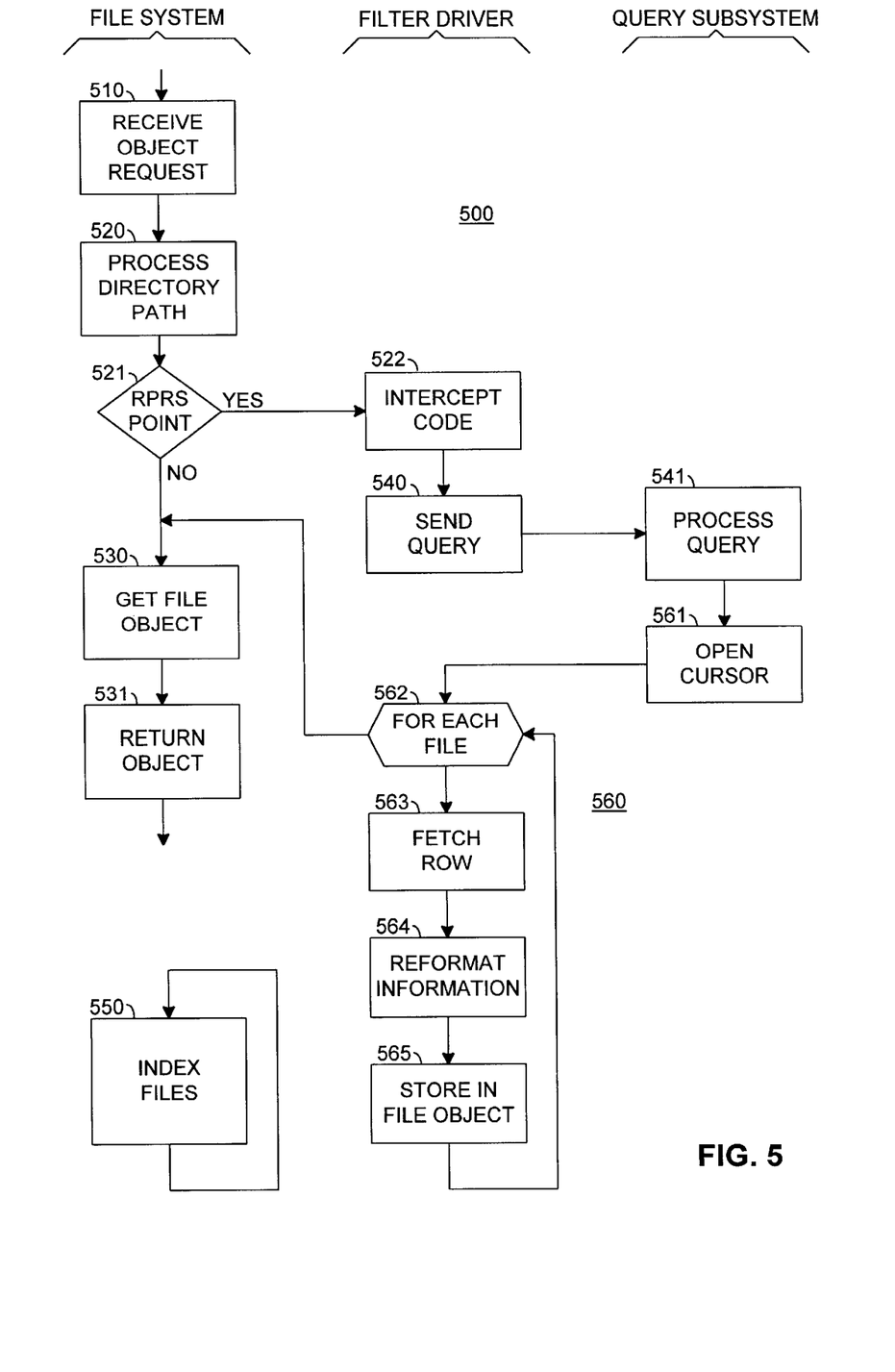
FIG. 5 is a flowchart describing the creation and use of dynamic links according to the invention.

FIG. 5 diagrams a method 500 for creating and manipulating dynamic symbolic links that have been defined by method 400, FIG. 4.

Block 510 initiates method 500 in file system 310, whenever it receives a request for a file-system service or operation form a user-level application program or from some other source. This description uses a request for a directory listing as an illustrative example of a file operation. Block 520 traverses file structure 200 searching for the requested file object. If block 521 does not encounter a reparse point, block 530 in the file system obtains the object, using the appropriate file-system drivers and device drivers shown in FIG. 3. Block 531 returns the object to the requesting application. For a directory request, the actual form of the object is a list of names, attributes, locations, and other information for each file in the directory. Where the directory is a conventional one, the file information is that of the actual files in the entries for that directory.

If block 521 encounters a reparse point having a return code indicating that it is an insertion point for dynamic links, then DL driver 313 intercepts the STATUS_REPARSE error code in block 522. (Without this intercept, any error code would be passed all the way back to the requester.) Block 540 sends the query text from the reparse point to client 341 of DBMS subsystem 340, which connects DBMS server 342 and passes the query to it for parsing and execution in a conventional manner. Filter driver 313 matches the "remainingName" against the list of files it gets from the DBMS, and constructs the new name of the file to be opened. Although server 342 could execute the query on a database that it manages, block 541 instead redirects the query to file database 346. Block 550 indicates the action of indexer 345 in continually indexing all the files in structure 200 asynchronously to the remainder of process 500, so as to maintain file database 346 current at all times. Method 500 can, however, employ other mechanisms for providing a current database or some other form of file information for creating dynamic links. For example, the file-structure directories themselves can form a searchable database. More generally, the invention can use any form of query processor, and can alternatively employ rule processors of other kinds, such as those found in expert systems.

Blocks 560 return database information for those files in structure 200 that satisfy the query. Block 561 opens a conventional cursor on the database. For each database row that satisfies the query, block 562 increments the cursor to point to that row in turn as the current row. Block 563 fetches the current row. Block 564 reformats the information in the row into proper form if required, and block 565 stores the information in the file object. For a directory-listing request, each row represents a file, and the columns contain file information, as described above. One of the file-information items is the actual location of the file in file structure 200. This location thus is a link to the file. When all rows have been processed, block 562 causes block 530 in I/O manager 310 to get the file object. Block 531 then returns the object to the requesting program 330 in the normal manner. In many file systems, block 531 returns a handle by which the requesting program can access a file object, rather than returning the object itself. Some operations, such as the directory listing used herein as an example, then employ the handle to obtain and return one file at a time through blocks 530 and 531 as the requesting program issues successive APIs for them, rather than returning all the information at once.

In this way, conventional application programs request and receive file objects in an entirely transparent manner, without any modification whatsoever. For example, an application program requests a directory listing using a conventional API for that purpose. The file system returns it via another standard API. The format of the listing is conventional, and the application can then open one of the files in the listing in its usual way. Method 500 at this point reads the file location at block 520, which now points to the actual location of the file in structure 200, rather than to the phantom directory at insertion point 230. File-system block 530 retrieves the file from its actual location, and block 531 returns it to the requesting application, all in a conventional manner. The only difference is that the file location information now forms a dynamic link to the actual location, rather than to the phantom directory at the insertion point that the user program thought it had requested. Any operation that application program 330 performs on the file, including modification, renaming, or deletion, is carried out on the real file at its actual location. Whenever the application releases an access via a standard file-system API, its file object disappears as it normally would. Therefore, the dynamic link merely disappears. The next request, by that application or by any other program, to insertion point 230 reexecutes method 500. Because block 550 continually updates the file-structure database, the links dynamically constructed by blocks 560 from their defining query might well differ from the links built during the previous request.

Figure 6:
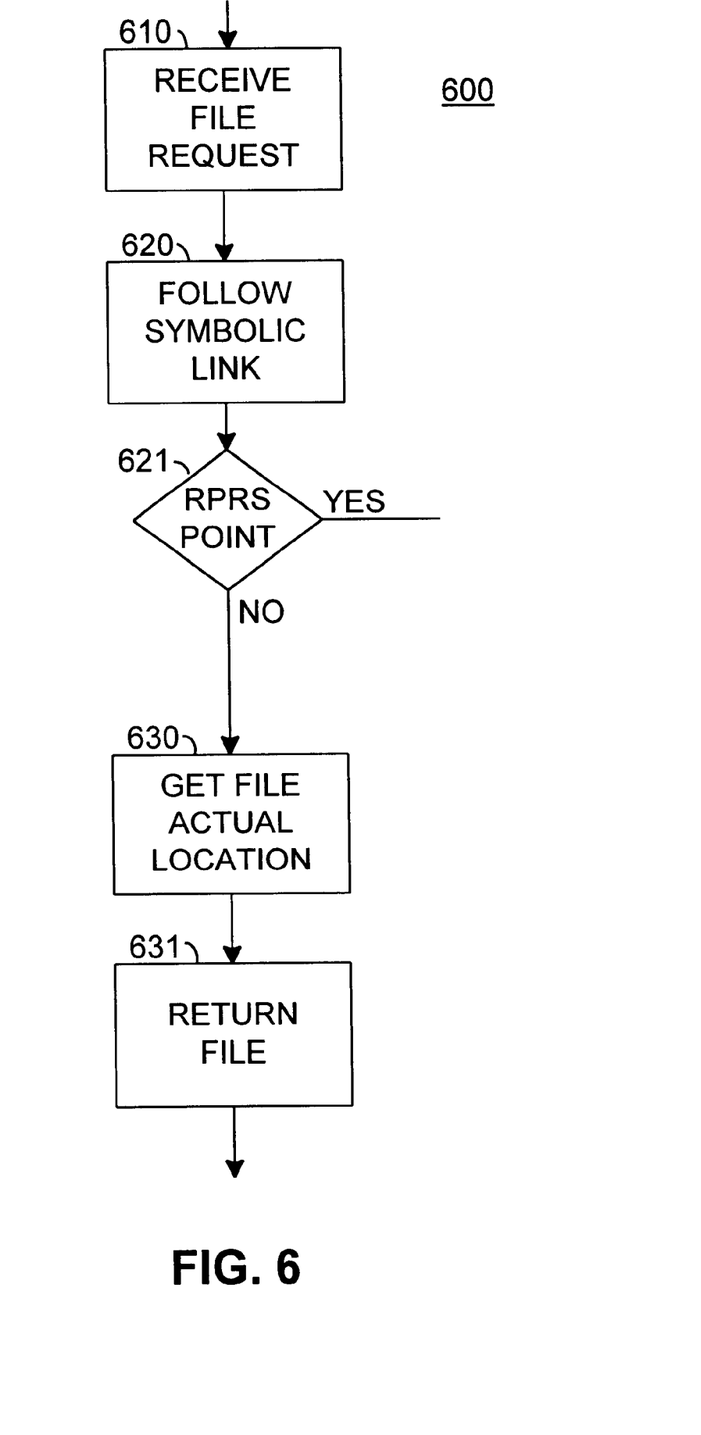
FIG. 6 is a flowchart illustrating the retrieval of a dynamically linked file according to the method of FIG. 5.

FIG. 6 is a flowchart 600 showing how method 500 retrieves dynamically linked files for an application program. Block 610 receives a request to, for example, open a file at block 610. Block 610 functions in exactly the same way as block 510, whether or not the requested file has a dynamic link. Block 620 follows the path of the directory returned by block 531, in exactly the same manner as block 530. The only difference is that the path to the actual location of the file was not placed in the directory by the file manager itself, but rather by DL filter driver 313. Because the file location actually exists in the file structure, it is treated like any other file, directory, or even another insertion point. Block 630 gets the file from its actual location just as block 530 would, and block 631 returns the file to the requesting program in the same way as block 531, FIG. 5. All of these blocks execute in the file manager 310 in a manner entirely transparent to the application program. That is, the application program need have no knowledge of the dynamic link, and need not request or receive the file any differently than a normal file.

Although dynamic symbolic links as described above are transparent to conventional application programs in almost all respects, there are a few differences. For example, the existence of multiple files having the same name is possible when the files are located in different actual directories. If such identically named files satisfy a query, then a request by an application file via an insertion point for a file having that name will produce an ambiguity. This issue could be resolved in any of several ways, such as by appending unique identifiers to the name of the different actual files. Directories at insertion points are read-only, so that no new files can be created in these directories; again, this facility can be provided if desired.

Many variations and alternatives within the scope of the following claims will appear to those skilled in the art. In particular, although the above description locates much of the invention in the kernel of an operating system, any component of the invention can be located in any defined level or space in the programming environment of a computer. Also, the terms "operating system," "file manager," "indexer," and so forth must be construed broadly. Software or hardware components having different names and overall functions may also serve the present invention. It must also be remembered that the methods defined below can be performed in any temporal order, except where specifically indicated in the claims.

We claim as our invention:

1. A method executed on a programmable computer for managing a file structure of file objects in a file system, the method comprising:
   defining a rule specifying a desired characteristic for a set of the file objects in the file system;
   designating a point in the file structure as an insertion point;
   persistently associating the rule with the insertion point;
   receiving a file-system request directed to the insertion point;
   constructing a set of dynamic links to the set of the file objects that satisfy the rule; and
   returning the dynamic links in a response to the request.

2. A computer-usable medium containing instructions and data for carrying out the method of claim 1 on a programmable data processor.

3. A method according to claim 1 wherein the file structure is a multi-level hierarchical structure.

4. A method according to claim 1 wherein the defining step comprises: defining a query for a database management system.

5. A method according to claim 1 wherein the rule comprises a query for a query processor.

6. A method according to claim 1 wherein the associating step causes a subsequent access to the insertion point to invoke the rule.

7. A method according to claim 1 wherein the receiving step comprises:
   receiving in the file system a name indicating one of a number of points in the file structure;
   detecting that the one point is the insertion point.

8. A method according to claim 1 wherein the constructing step comprises:
   searching the file structure for a set of file objects that satisfy the rule.

9. A method according to claim 8 wherein the file objects in the structure have respective locations within the structure, and wherein the constructing step further comprises
   returning the actual location of each of the files in the set as a dynamic link for that file.

10. A computer-readable medium containing a representation of the method of claim 8.

11. A method according to claim 1 further comprising indexing the file objects in the file structure asynchronously with respect to the remaining steps.

12. A method according to claim 1 wherein the indexing step includes building a database of the file objects in the file structure.

13. A method according to claim 1 further comprising accessing one or more of the file objects in the response.

14. A programmable digital computer for executing application programs that access file objects located at multiple points in a file structure of a file system, the computer comprising:
   storage means for storing the file objects;
   input-output means for receiving a rule and for designating one of said multiple points as an insertion point, wherein the rule is persistently associated with the insertion point;
   query processor means for determining which of the file objects at any of the multiple points satisfy the rule;
   file processor means for managing the file structure;
   dynamic link driver means coupled to the file processor means and to the query processor for detecting an access request directed to the insertion point, and in response thereto for constructing a set of dynamic links from the insertion point to those of the file objects that satisfy the rule.

15. A computer according to claim 14 wherein the file processor means executes a file manager in an operating system.

16. A computer according to claim 14 wherein the dynamic link driver means intercepts calls to the file processor means for access to the file system objects.

17. A computer according to claim 14 wherein the query processor means is a database management system.

18. A computer according to claim 14 wherein the query processor means includes a client means coupled to the dynamic link driver means.

19. A computer according to claim 18 wherein the input/output means includes an association utility means for associating the rule with the insertion point.

20. A computer according to claim 18 wherein the rule is a query in the query language of the query processor means.

21. A method executed on a computer for managing a file structure of file objects at multiple different locations, comprising:
   receiving a request for a file object at one of the locations;
   detecting that the one location is an insertion point;
   accessing a rule persistently associated with the insertion point;
   determining the locations of the file structure of a set of file objects that satisfy the rule;
   constructing a set of dynamic links from the insertion point to each of the locations of the file objects in the set;
   returning the dynamic links as a response to the request.

22. A computer-usable medium containing instructions and data for carrying out the method of claim 21 on a programmable data processor.

23. A method according to claim 21 wherein the file structure is a multi-level hierarchical structure.

24. A method according to claim 21 wherein the rule is a query executable by a database management system.

25. A method according to claim 24 wherein determining the locations in the file structure of a set of file objects that satisfy the rule comprises searching a database for file objects that satisfy the query.

26. A computer-readable medium containing instructions and data for carrying out the method of claim 25.

27. A method according to claim 25 further comprising indexing the file structure so as to construct the database.

28. A method according to claim 27 wherein the indexing is performed asynchronously with respect to the remaining steps.

29. A method according to claim 21 wherein the rule designates certain characteristics of the set of file objects, and wherein constructing the dynamic links comprises:
   searching the file structure for the set of the file objects having the certain characteristics;
   constructing a separate dynamic link for each of the file objects in the set to the insertion point.

30. A method according to claim 29 wherein each of the dynamic links is the actual location of one of the file objects in the set.

31. A method according to claim 21 further comprising accessing one of the file objects in the set after the response has been returned.

32. A method according to claim 31 wherein accessing the one file object comprises:
   receiving a request for the one file object directed to the insertion point;
   reading the actual location of the one file object in the file structure from the dynamic link for the one file object;
   returning the one file object from its actual location.

33. A programmable digital computer for executing application programs that access file objects located at multiple points in a file structure of a file system, the computer comprising:
   a file manager for receiving file-object requests from the application program and for returning requested file objects thereto;
   a link driver coupled to the file manager for intercepting requests directed to a predefined insertion point in the file structure and for fetching a rule persistently associated with the insertion point;

a subsystem coupled to the link driver for determining a set of the file objects at any of the multiple points in the file structure that satisfy the rule, the link driver further returning the set of file objects as the requested file objects.

34. A computer according to claim 33 wherein the subsystem for determining the set of file objects is a database management system.

35. A computer according to claim 34 wherein the rule is a query processed by the database management system.

36. A computer according to claim 34 wherein the database management system includes a client coupled to the dynamic link driver means.

37. A computer according to claim 33 further including an indexer for constructing and continually updating a database of the file objects in the file structure.

38. A computer according to claim 37 wherein the indexer operates asynchronously with respect to the file manager.

39. A method executed on a computer for creating dynamic symbolic links in a file structure of file objects at multiple different locations in a file system, comprising:

receiving a designation of a desired location for the set of file objects;

creating an insertion point at the desired location;

receiving a rule specifying a desired characteristic of the file objects in the set, wherein each file object in the set satisfies the rule;

receiving a rule specifying the file objects in the set;

persistently associating the rule with the insertion point.

40. A computer-usable medium containing instructions and data for carrying out the method of claim 39 on a programmable data processor.

41. A method according to claim 39 wherein the insertion point is a reparse point.

42. A method according to claim 39 wherein the rule specifies desired characteristic for the set of file objects.

43. A method according to claim 39 wherein the rule is a query for a database management system.

44. A method according to claim 39 wherein the rule is stored in the file structure at the insertion point.

* * * * *